(12) United States Patent
Gaddy et al.

(10) Patent No.: US 8,982,950 B1
(45) Date of Patent: Mar. 17, 2015

(54) SYSTEM AND METHOD FOR RESTORATION OF DYNAMIC RANGE OF IMAGES AND VIDEO

(71) Applicant: A2Zlogix, Inc., Edison, NJ (US)

(72) Inventors: William L. Gaddy, Milford, PA (US); Vidhya Seran, Irving, TX (US)

(73) Assignee: A2Zlogix, Inc., Edison, NJ (US)

( * ) Notice: Subject to any disclaimer, the term of this patent is extended or adjusted under 35 U.S.C. 154(b) by 0 days.

(21) Appl. No.: 14/491,178

(22) Filed: Sep. 19, 2014

(51) Int. Cl.
*H04N 7/12* (2006.01)
*H04N 19/30* (2014.01)

(52) U.S. Cl.
CPC .................................. *H04N 19/30* (2013.01)
USPC .................................................... 375/240.03

(58) Field of Classification Search
CPC .............. H04N 19/30; H04N 19/0009; H04N 19/00315
USPC ..................... 375/240.03; 382/165
See application file for complete search history.

(56) References Cited

U.S. PATENT DOCUMENTS

2010/0260416 A1* 10/2010 Tsutsumi ...................... 382/165

* cited by examiner

*Primary Examiner* — Allen Wong
(74) *Attorney, Agent, or Firm* — Lowenstein Sandler LLP

(57) ABSTRACT

A processing device receives, from an upstream device, a D-dimensional vector data set of media content, wherein D is greater than or equal to one. The processing device applies a low-frequency-pass method to the received D-dimensional media content to generate a low-frequency D-dimensional vector data set of media content. The processing device obtains a structure tensor field comprising a set of D-dimensional structure tensors corresponding to each vector of the received D-dimensional media content. The processing device performs an eigensystem analysis for each structure tensor in the field of structure tensors to generate a plurality of D eigenvalue fields comprising D eigenvalues for each vector of the received D-dimensional media content. The processing device interpolates between each vector of the received D-dimensional media content and a corresponding vector from the low-frequency D-dimensional media content in view of one or more of the D eigenvalues for each vector of the plurality of D eigenvalue fields to produce a restored-dynamic range D-dimensional vector data set of media content.

24 Claims, 15 Drawing Sheets

SYSTEM AND METHOD FOR RESTORATION OF DYNAMIC RANGE OF IMAGES AND VIDEO

TECHNICAL FIELD

Embodiments of the present disclosure relate to image processing, and, more particularly, to the field of restoration of dynamic range within video or images without directly coupling to an upstream encoding or decoding process.

BACKGROUND

A common artifact typically present in statistical, predictive, and perceptual image compression systems is a reduction of color or brightness dynamic range. This is intentional, in most cases, since the quantization applied to reduce the dynamic range is not meant to be perceivable by most humans under normal viewing conditions. However, as channel transmission bandwidths become more and more constrained, and more and more compression of images and video is demanded, typical encoders—and accordingly their matched decoders—introduce several objectionable artifacts at the final viewing end under these constrained conditions.

In addition to blocking artifacts prevalent with previous generation encoding standards such as MPEG2, artifacts introduced by contemporaneous compression technologies such as H.264 or MPEG-4 Part 10, Advanced Video Coding (MPEG-4 AVC), and High Efficiency Video Coding (HEVC), have traded blocking artifacts for other artifacts such as blurring and color-banding when transmission capacity is under-provisioned. Color banding is one of the most noticeable of these artifacts because of spatial high-frequency color contours that are readily apparent in still images, and more apparent when the banding or contour edges are moving within an image sequence. In addition, encoding standards that frequently exhibit color banding, such as JPEG, are likely to continue to be prevalent because of their early success. These artifacts have several names known in the art; less formally, called "banding", or "color contouring". These artifacts are more broadly known as dynamic range reduction, since they are a result of digital quantization of a signal under analysis.

Alleviating such artifacts has many possible solutions, such as increasing the transmission bandwidth or increasing color space subsampling from YUV420 subsampling to those such as YUV444, but come at considerable costs. One solution would treat color banding artifacts as a post-decoder post-processing solution prior to rendering to a display device.

Attempts have been made to address the general problem of generating high-dynamic range images from low-dynamic range images, but they suffer from some critical disadvantages.

U.S. Patent Application Publication No. 2014/0079335 discloses a high-dynamic-range imaging system that analyses relative exposure levels by using motion analysis. However, this approach only works for video and moving imagery, and is not suitable for single images.

U.S. Patent Application Publication No. 2013/0107956 (hereinafter "the '956 publication") discloses a method to generate high dynamic range images from low dynamic range images. However, the method disclosed in the '956 publication employs a predictive mapping that is closely coupled to the image encoder and decoder, which requires changes to an end-user device decoder. This renders the method disclosed in the '956 publication infeasible to employ for most mobile applications. Additionally, the method disclosed in the '956 publication requires high-dynamic range reference imagery such as YUV444, which is usually not available.

U.S. Patent Application Publication No. 2014/0177706 (hereinafter "the '706 publication") discloses a method and system that provides super-resolution of quantized images and video. While the method disclosed in the '706 publication could be altered to restore dynamic range instead of spatial resolution, the method disclosed in the '706 publication is similarly closely coupled to the encoder and decoder processes, rendering the method disclosed in the '706 publication infeasible for mobile applications.

Other related art methods specifically attempt to solve the problem of banding and contouring of quantized images, such as found with aggressively compressed images or video, with a decoupled post-processing method or system. Typically such methods operate by selectively blurring parts of a given low-dynamic range image, and differ primarily by the method that masks which regions are and are not spatially blurred. Such filtering is a subset of the general dynamic range restoration problem.

U.S. Pat. No. 8,582,913 (hereinafter "the '913 patent") discloses a post-processing controller to generate high-dynamic range images from low dynamic range images. While the controller as disclosed is amenable to real-time operations, it uses a brightness enhancement function tied to the angular spatial frequency represented by features in an image, which requires that the disclosed process have information about the display width and height, and the intended distance of the viewer from the display, limiting its application to professional applications and rendering the method disclosed in the '913 patent unsuitable for general consumer applications. Furthermore, the method disclosed in the '913 patent uses simple thresholds in its masking operation, meaning that it is prone to false positives such as smoothing areas with no banding but legitimate image detail, and false negatives such as not eliminating contouring artifacts where they should be treated.

International PCT Publication No. WO/2005/101309 (hereinafter "the '309 publication") also discloses methods and systems for converting images from low dynamic range to high dynamic range. However, like several others, the methods disclosed in the '309 publication uses simple thresholds in its masking operation, meaning that it is not robust, and prone to false positives such as smoothing areas with no banding but legitimate image detail, and false negatives such as not eliminating contouring artifacts where they should be treated.

Such banding and contouring artifacts may be treated in the frequency domain by selective convolution, however the process of converting to and from the frequency domain renders selective convolution ineffective for processing full-resolution imagery on contemporaneous mobile consumer devices.

In addition, the foregoing methods are generally applied to a single purpose, namely the reduction of image banding and contouring artifacts due to limited dynamic range of digital sensors or compression-related quantization. The foregoing methods have no general applicability to other related problems in the art such as quantization errors of vertex location of 3D models, and the restoration of dynamic range of other D-dimensional datasets.

SUMMARY

The above-described problems are remedied and a technical solution is achieved in the art by providing a system and method for restoration of the dynamic range of images, video, and other D-dimensional data sets without coupling to an upstream encoding, decoding, or quantization process. In one example, a media content processor of a processing device may generate a Gaussian pyramid from input image data or video data. The media content processor may generate a structure tensor field comprising a set of structure tensors for each pixel of the input image data or video data. The media content processor may compute an eigensystem analysis for each of the structure tensors of each pixel of the input image data or video data, resulting in a plurality of eigenvalue fields. The media content processor may generate a Gaussian pyramid from each of the plurality of eigenvalue fields.

The color channel processor may select one or more of the eigenvalues of each element of the lowest resolution level of computed Gaussian pyramids from each of the eigenvalue fields to assign a linear weight to each pixel of the lowest resolution Gaussian pyramid computed from each of the eigenvalue fields. The color channel processor may interpolate, using a corresponding linear weight, between (1) each pixel of the lowest resolution pyramid of the Gaussian pyramid computed from the input image data or video data, and (2) a corresponding pixel of the plurality of pixels of the input image data or video data using a corresponding computed weight to produce a restored dynamic range image or video.

The color channel processor may display the restored dynamic range image data or video data on a display or transmit the restored dynamic range image or video to one or more downstream devices. In an example, the linear weighting may be scaled according to a region-of-support used for the structure tensor analysis. In an example, the structure tensor analysis may be performed with only one channel—such as the luminance of each pixel of an input image—while the weighted interpolation may jointly be performed on all channels of a multichannel image—such as all 3 channels (luminance and Cb, Cr) of a YCbCr image. In an example, the input image Gaussian pyramid and the eigenvalue field Gaussian pyramids may be calculated in parallel.

The above-described problems are remedied and a technical solution is achieved in the art by providing a system and method for restoration of the dynamic range of images, video, and other D-dimensional data sets without coupling to an upstream encoding, decoding, or quantization process. In one example, a media content processor of a processing device may receive, from an upstream device, a D-dimensional vector data set of media content, wherein D is greater than or equal to one. The media content processor may apply a low-frequency-pass method to the received D-dimensional vector data set of media content to generate a low-frequency D-dimensional vector data set of media content. The media content processor may obtain a structure tensor field comprising a set of D-dimensional structure tensors corresponding to each vector of the received D-dimensional vector data set of media content. The media content processor may perform an eigensystem analysis for each structure tensor in the field of structure tensors to generate a plurality of D eigenvalue fields comprising D eigenvalues for each vector of the received D-dimensional vector data set of media content. The media content processor may interpolate between each vector of the received D-dimensional vector data set of media content and a corresponding vector from the low-frequency D-dimensional vector data set of media content in view of one or more of the D eigenvalues for each vector of the plurality of D eigenvalue fields to produce a restored-dynamic range D-dimensional vector data set of media content. The media content processor may output the restored-dynamic range D-dimensional vector data set of media content to a display or downstream device.

In an example, the media content may comprises at least one of audio, one or more two-dimensional still images, one or more three-dimensional still images, two-dimensional video, three-dimensional video, magnetic resonance imaging (MRI) data, computed tomography (CT)-scan data, geometric data, seismic data, holographic data, or meteorological data.

In an example, the low-frequency-pass method may comprise the media content processor generating a D-dimensional Gaussian pyramid from the received D-dimensional vector data set of media content and selecting D-dimensional vector data from the lowest dimension pyramid level of the D-dimensional Gaussian pyramid to generate the low-frequency D-dimensional vector data set of media content.

In an example, the media content processor obtaining a set of D-dimensional structure tensors may comprise the media content processor computing a set of D-dimensional directional gradients for each vector of the received D-dimensional vector data set of media content. In an example, the media content processor obtaining a set of D-dimensional structure tensors may comprise the media content processor performing a structure tensor analysis with one element of each vector of the received D-dimensional vector data set of media content.

In an example, interpolating may comprise the media content processor linearly interpolating between each vector of the received D-dimensional vector data set of media content and the corresponding vector from the low-frequency D-dimensional vector data set of media content. In an example, interpolating may comprise the media content processor generating a Gaussian pyramid from each of the plurality of D eigenvalue fields. The media content processor may further employ one or more of the D eigenvalues to assign linear weights to each vector of the lowest resolution plurality of D eigenvalue fields. The media content processor may further employ the linear weights to interpolate between each vector of the received D-dimensional vector data set of media content and the corresponding vector from the low-frequency D-dimensional vector data set of media to produce the restored-dynamic range D-dimensional vector data set of media content. In an example, the linear weights may be assigned in view of a region-of-support used for obtaining the structure tensor field.

In an example, the media content processor employing one or more of the D eigenvalues to assign linear weights to each vector of the lowest resolution plurality of D eigenvalue fields may comprise the media content processor selecting an eigenvalue of the D eigenvalues indicative of a homogenous region of support about a vector of the received D-dimensional vector data as the lower bound for assigning the linear weights. The media content processor may further select one of the remaining eigenvalues of the D eigenvalues indicative of an edge or highly textured region of support about a vector of the received D-dimensional vector data as the upper bound for assigning the linear weights.

In an example, interpolating may comprise the media content processor performing an interpolation jointly between all element of each vector of the received D-dimensional vector data set of media content and the corresponding elements of each vector from the low-frequency D-dimensional vector data set of media content.

In an example, the interpolating and applying a low-frequency-pass method may be performed in parallel.

In an example, each vector of the received D-dimensional vector data of media content, the low-frequency D-dimensional vector data set of media content, and the restored-dynamic range D-dimensional vector data of media content may each comprise N-dimensional scalar values where N is equal to or greater than 1. In an example, the received D-dimensional vector data set of media content, the low-frequency D-dimensional vector data set of media content, and the restored-dynamic range D-dimensional vector data set of media content may each comprise D-dimensional pixel values. In an example, the pixel values may comprise color values or luminance values or both color values and luminance values.

BRIEF DESCRIPTION OF THE DRAWINGS

The present invention may be more readily understood from the detailed description of examples presented below presented below considered in conjunction with the attached drawings and in which like reference numerals refer to similar elements.

Figure 1:
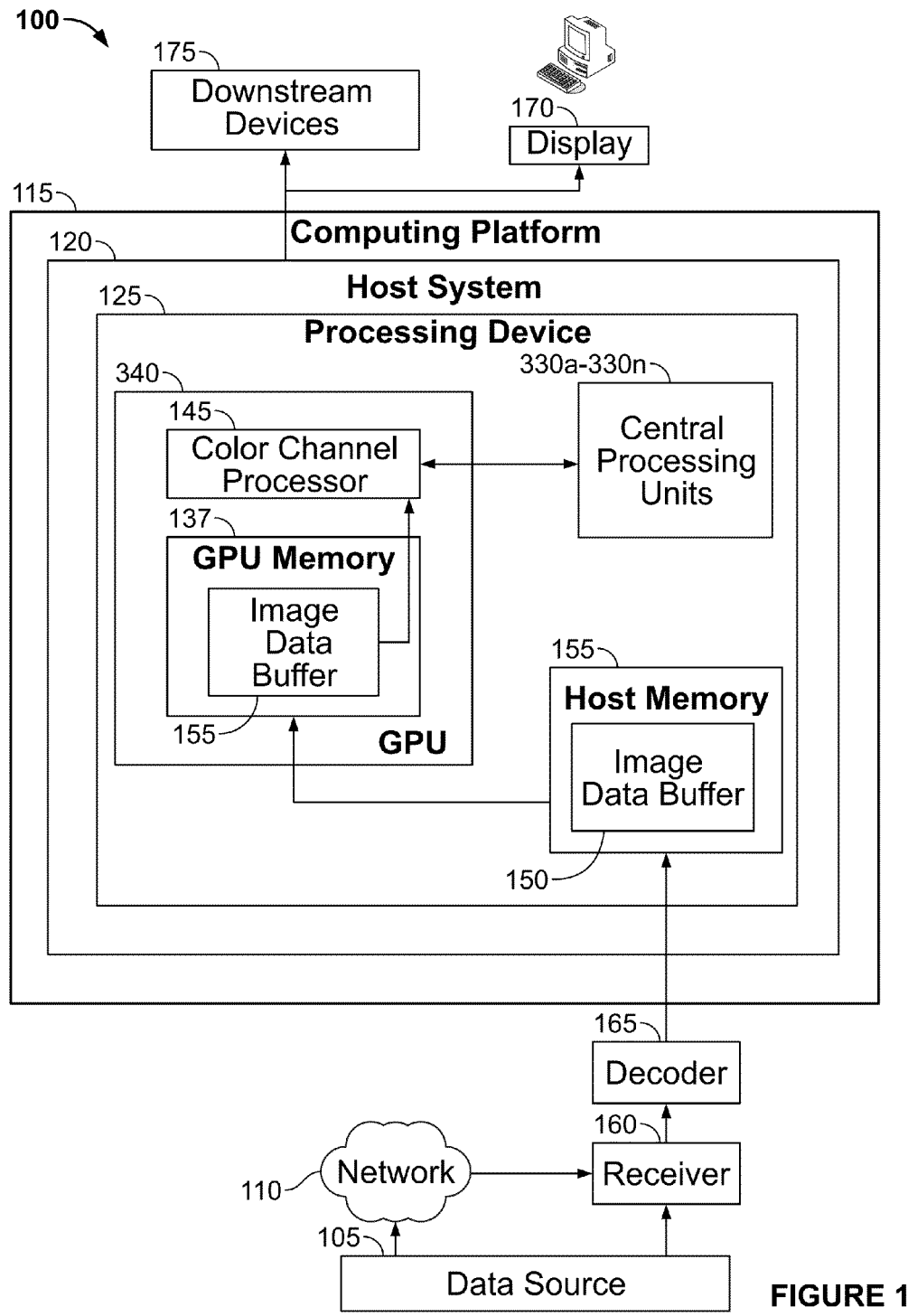
FIG. 1 is a block diagram of an example computing system that receives and restores the dynamic range of images and video without close coupling to an upstream encoding or decoding process in which examples of the present disclosure may operate.

It is to be understood that the attached drawings are for purposes of illustrating the concepts of the invention and may not be to scale.

DETAILED DESCRIPTION

The above-described problems are remedied and a technical solution is achieved in the art by providing a system and method for the restoration of the dynamic range of images, video or other D-dimensional data sets without close coupling to an upstream encoding, decoding, or quantization process. Examples of the present disclosure permit reduced transmission bandwidth of images and video, requiring no changes to the image or video encoders, decoders, or standards thereof, and without introducing visible artifacts. Examples of the present disclosure are directed to restoring the dynamic range of either luminance, color, or both, within in the category of video or images. Those skilled in the art will appreciate the application of examples of the present disclosure in other fields such as medical imaging, image analysis and classification, and general signal dynamic range restoration for such signal types as audio, 3D datasets, holographic datasets, and other media and data types constrained by dynamic range, by way of non-limiting examples. Although examples of the present disclosure may be described in terms of images and video, the restoration of dynamic range for other D-dimensional datasets where D is greater than 1 as in images and video, such as 3D scans, meteorological and seismic data, can employ concepts disclosed herein to improve upon acquisition system limits with respect to dynamic range.

Examples of the present disclosure may be configured to restore the dynamic range of images, video and other D-dimensional data sets without close coupling to an upstream encoding, decoding, or other quantization process. Examples of the present disclosure are efficient enough to run on real time for HD scale video on end-user devices such as cellphones and set top boxes, robustly without degrading image detail and high-frequency spatial information such as fine textures, detail, and edge information.

Eigensystem analysis is known in the art for such tasks as principal component analysis, fluid dynamics calculations, and material stress calculations. Eigensystem analysis can provide a very robust D-dimensional masking function for a post-processing method to restore dynamic range in images and other D-dimensional data sets. U.S. Pat. No. 8,355,534 (hereinafter "the '534 patent") discloses eigensyetem analysis of spatio-temporal structure tensors of input images, but the eigensyetem analysis is employed primarily to determine the orientation of edge features in a very accurate way so as to avoid the well-known aperture problem in motion estimation.

Another use of eigensystem analysis includes the computation of the principal component(s) of a color distribution in an image, such as taught in US Patent Application Publication No. 2014/0098263 (hereinafter "the '263 publication"). However, the '534 patent and the '263 do not benefit from the use of a structure tensor's eigenvalue fields as a smooth masking function for dynamic range enhancement.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring examples of the present disclosure.

FIG. 1 is a block diagram of an example computing system 100 that receives and restores the dynamic range of images and video without close coupling to an upstream encoding or decoding process in which examples of the present disclosure may operate. By way of non-limiting example, the computing system 100 may be configured to receive encoded image data or video data from one or more data sources 105. The computing system 100 may also include a computing platform 115. The computing platform 115 may comprise a host system 120, which may comprise, for example, a processing device 125, such as one or more central processing units 130a-130n. The processing device 125 may be coupled to a host memory 135. The host memory 135 may store the encoded image data or video data received from the one or more data sources 105 in an image data buffer 150. The encoded image data or video data may be received by a receiver 160, decoded by a decoder 365, and passed to an image data buffer 150. The receiver 160 may receive the encoded image data or video data either directed from the one or more data sources 105 or over a network 110. In one example, one or both of the receiver 360 or the decoder 365 may be external to the processing device 325 or the computing platform 115. In another example, one or both of the receiver 160 or the decoder 165 may be integrated with the processing device 125 or the computing platform 115.

The processing device 125 may further implement a graphics processing unit 140 (GPU). It will be appreciated by those skilled in the art that other co-processor architectures may be utilized besides GPUs, such as, but not limited to, DSPs, FPGAs, or ASICs, or adjunct fixed-function features of the processing device 125 itself. It will further be appreciated by those skilled in the art that the GPU 140 may be collocated on the same physical chip or logical device as the central processing units 130a-130n, also known as an "APU", such as found on mobile phones and tablets. Separate GPU and CPU functions may be found on computer server systems where the GPU is a physical expansion card, and personal computer systems and laptops. The GPU 140 may comprise a GPU memory 137. It will be appreciated by those skilled in the art that the host memory 135 and GPU memory 137 may also be collocated on the same physical chip(s) or logical device, such as on an APU. It will further be appreciated by those skilled in the art that the decoding processing device 125 may be partially or wholly integrated with the encoding processing device 125 into the computing system 100 of FIG. 1 to provide both encoding and decoding functionality.

The processing device 125 may be configured to receive encoded image data or video data from the data source 105 through the receiver 160. The processing device 125 may be configured to create the image data buffer 150 based on the received encoded image data or video data to a decoder 165 to decode the image buffer 150. The decoder 165 may be configured to transfer image data or video data stored in the image buffer 150 to the GPU memory 137 as image data or video data stored in the image buffer 155.

The processing device 125 may be configured to implement a color channel processor 145 to receive the image data or video data stored in the image buffer 155 and received from the decoder 165, a demultiplexer (not shown) or an unwrapper (not shown). In one example, the processing device 125 may implement the color channel processor 145 as a component of the GPU 140.

In one example, the color channel processor 145 may be configured to compute a Gaussian pyramid from the image data or video data stored in the image buffer 155. The color channel processor 145 may be configured to create structure tensors for each of the plurality of pixels of image data or video data stored in the image buffer 155. The color channel processor 145 may be configured to compute an eigensystem analysis of structure tensors corresponding each of the plurality of pixels of image data or video data stored in the image buffer 155 to generate eigenvalue fields from the structure tensors. The color channel processor 145 may be configured to compute Gaussian pyramids from each of the eigenvalue fields.

The color channel processor 145 may be configured to select one or more of the eigenvalues of each element of the lowest resolution level of computed Gaussian pyramids from each of the eigenvalue fields to assign a linear weight to each pixel of the lowest resolution Gaussian pyramid computed from each of the eigenvalue fields. The color channel processor may be configured to interpolate, using a corresponding linear weight, between (1) each pixel of the lowest resolution pyramid of the Gaussian pyramid computed from the image data or video data stored in the image buffer 155, and (2) a corresponding pixel of the plurality of pixels of input image data or video data stored in the image buffer 155 using a corresponding computed weight to produce a restored dynamic range image or video. The color channel processor 145 may be configured to convey the restored dynamic range image or video into the image buffer 155, suitable for display output on a display 170 or for transmission to one or more downstream devices 175.

Figure 2:
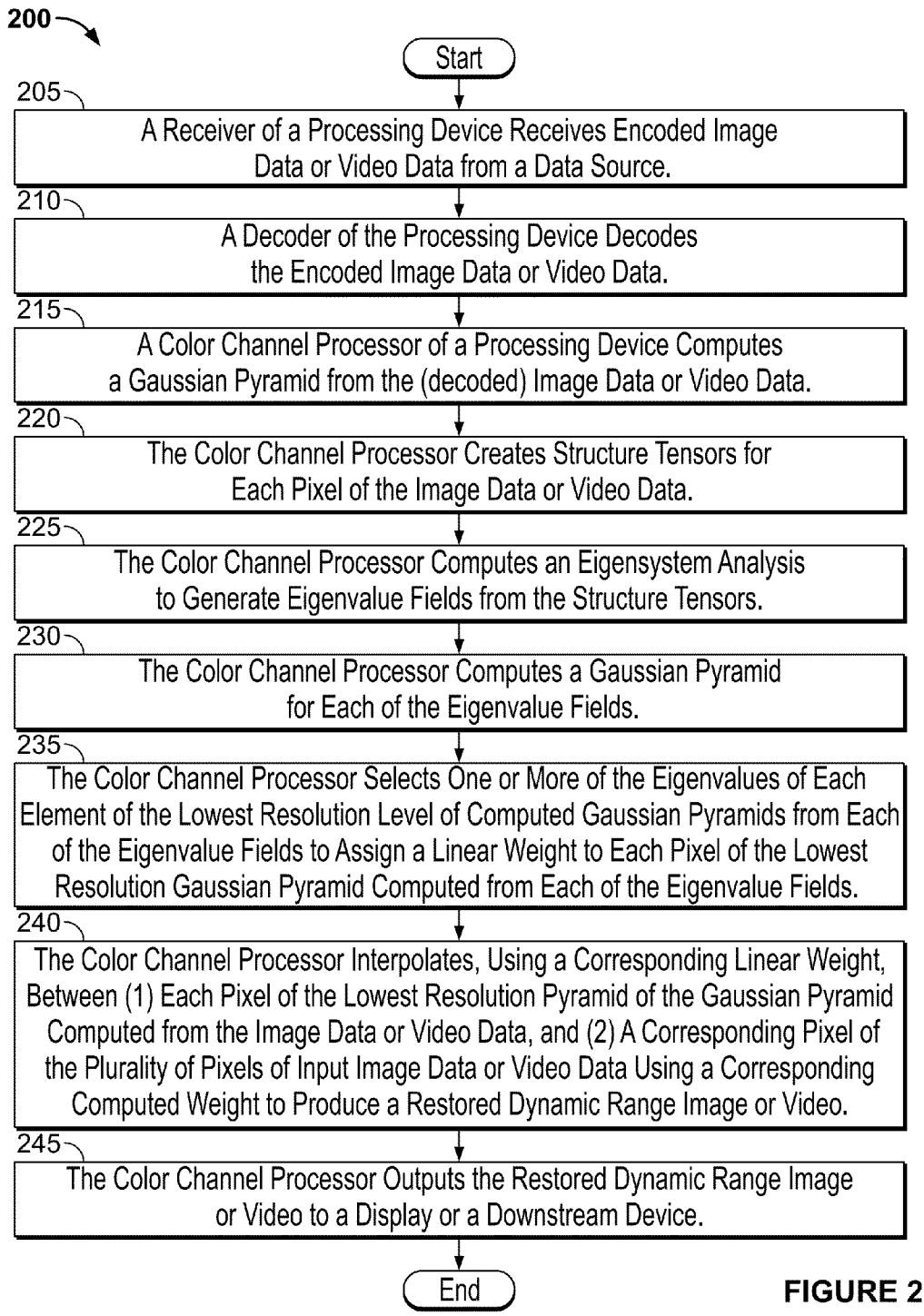
FIG. 2 is a flow diagram illustrating an example of a method for restoration of the dynamic range of images or video without close coupling to an upstream encoding, decoding, or quantization process using the system of FIG. 1.

FIG. 2 is a flow diagram illustrating an example of a method 200 for restoration of the dynamic range of images or video without close coupling to an upstream encoding, decoding, or quantization process. The method 200 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 100 may be performed primarily by the color channel processor 145 of the computing system 100 of FIG. 1.

As shown in FIG. 2, to permit the computing system 100 to decode image data or video data, at block 205, the receiver 160 may receive encoded image data or video data from the data source 105. At block 210, the decoder 165 may decode the encoded image data or video data, and may place the decoded image data or video data in an image data buffer 150 of the processing device 125. The processing device 125 may transfer the decoded image data or video data in the image data buffer 150 to GPU image buffer 155 of the GPU memory 137. The color channel processor 145 may receive the decoded image data or video data in the image data buffer 155 from GPU memory 137.

The decoded image data or video data in the image data buffer 155 may comprise a plurality of pixels, wherein each pixel comprises one or more color channels.

At block 215, the color channel processor 145 may compute a Gaussian pyramid from the decoded image data or video data in the image data buffer 155. At block 220, color channel processor 145 may create structure tensors for each of the plurality of pixels in the input image buffer 155. At block 225, the color channel processor 145 may compute an eigensystem analysis of the structure tensors to generate eigenvalue fields from the structure tensors. At block 220, the color channel processor 145 may compute Gaussian pyramids from each of the eigenvalue fields. At block 235, the color channel processor 145 may select one or more of the eigenvalues of each element of the lowest resolution level of computed Gaussian pyramids from each of the eigenvalue fields to assign a linear weight to each pixel of the lowest resolution Gaussian pyramid computed from each of the eigenvalue fields. At block 240, the color channel processor interpolates, using a corresponding linear weight, between (1) each pixel of the lowest resolution pyramid of the Gaussian pyramid computed from the image data or video data stored in the image buffer 155, and (2) a corresponding pixel of the plurality of pixels of input image data or video data stored in the image buffer 155 using a corresponding computed weight to produce a restored dynamic range image or video.

The color channel processor 145 may convey the restored dynamic range image or video into the image buffer 155, suitable, at block 245, for the color channel processor 145 to display as output on a display 170 or to transmit to one or more downstream devices 175.

Figure 3:
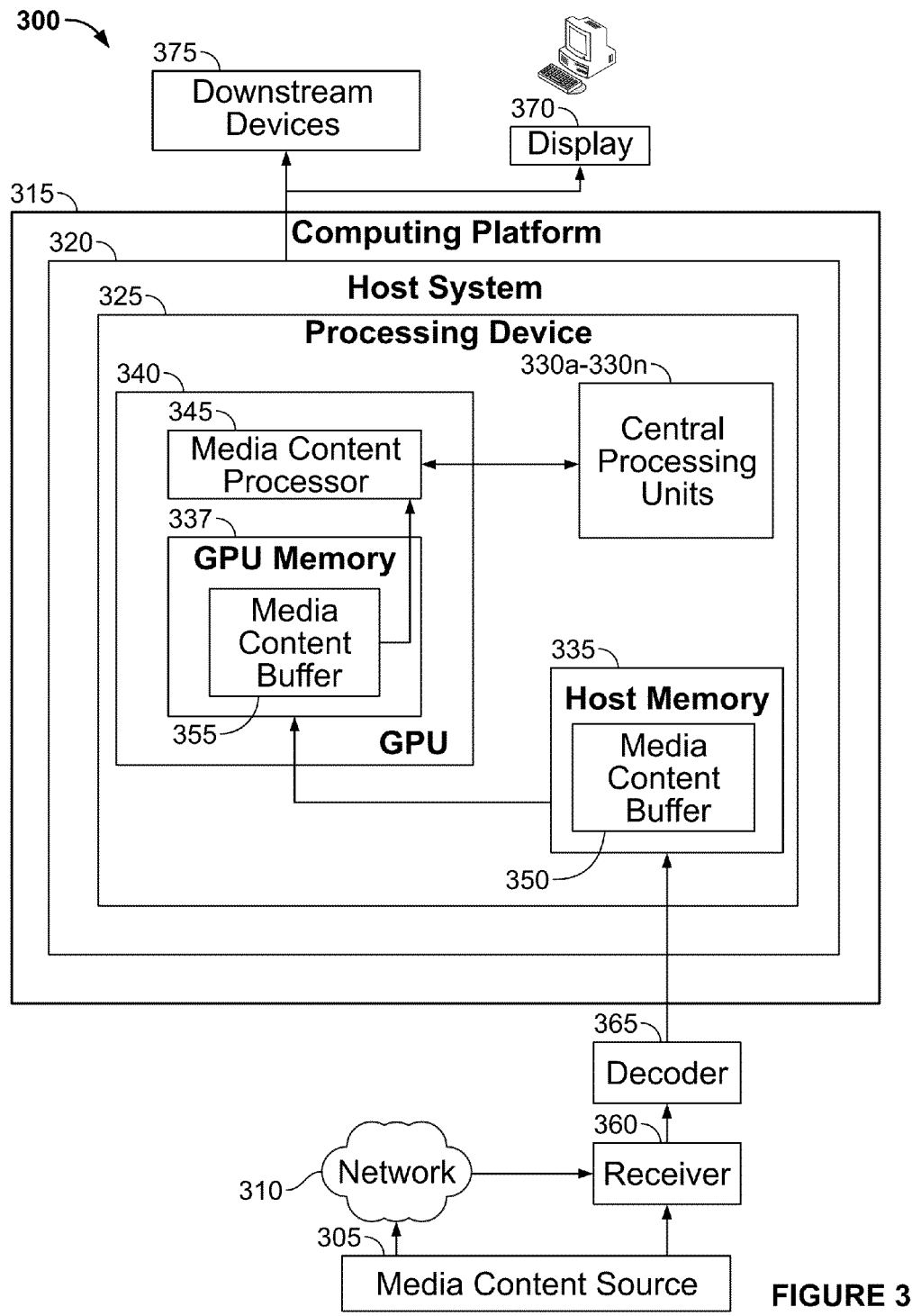
FIG. 3 is a block diagram of another example computing system that receives and restores the dynamic range of D-dimensional vector data set of media content, wherein D is greater than or equal to one, without close coupling to an upstream encoding or decoding process in which examples of the present disclosure may operate.

FIG. 3 is a block diagram of another example computing system 300 that receives and restores the dynamic range of D-dimensional vector data set of media content (collectively "D-dimensional media content"), wherein D is greater than or equal to one, without close coupling to an upstream encoding or decoding process in which examples of the present disclosure may operate.

In an example, the D-dimensional media content may comprise at least one of audio, one or more two-dimensional still images, one or more three-dimensional still images, two-dimensional video, three-dimensional video, magnetic resonance imaging (MRI) data, computed tomography (CT)-scan data, geometric data, seismic data, holographic data, or meteorological data.

By way of non-limiting example, the computing system 300 may be configured to receive encoded D-dimensional media content from one or more media content sources 305. The computing system 300 may also include a computing platform 315. The computing platform 315 may comprise a host system 320. The host system 120 may comprise, for example, a processing device 325, such as the one or more central processing units 330a-330n. The processing device 325 may be coupled to the host memory 335. The host memory 335 may store the encoded D-dimensional media content received from the one or more media content sources 305 in a media content buffer 350. The encoded D-dimensional media content may be received by a receiver 360, decoded by a decoder 365, and passed to the media content buffer 350. The receiver 360 may receive the encoded D-dimensional media content either directly from the one or more media content sources 305 or over a network 310. In one example, one or both of the receiver 360 or the decoder 365 may be external to the processing device 325 or the computing platform 315. In another example, one or both of the receiver 360 or the decoder 365 may be integrated with the processing device 325 or the computing platform 315.

The processing device 325 may further implement a graphics processing unit 340 (GPU). It will be appreciated by those skilled in the art that other co-processor architectures may be utilized besides GPUs, such as, but not limited to, DSPs, FPGAs, or ASICs, or adjunct fixed-function features of the processing device 325 itself. It will further be appreciated by those skilled in the art that the GPU 340 may be collocated on the same physical chip or logical device as the central processing units 330a-330n, also known as an "APU", such as found on mobile phones and tablets. Separate GPU and CPU functions may be found on computer server systems where the GPU 340 may be a physical expansion card, and personal computer systems and laptops. The GPU 340 may comprise a GPU memory 337. It will be appreciated by those skilled in the art that the host memory 335 and GPU memory 337 may also be collocated on the same physical chip(s) or logical device, such as on an APU. It will further be appreciated by those skilled in the art that the decoding processing device 325 may be partially or wholly integrated with the encoding processing device 325 into the computing system 300 of FIG. 3 to provide both encoding and decoding functionality.

The processing device 325 may be configured to receive the encoded D-dimensional media content from the media content source 305 through the receiver 360. The processing device 325 may be configured to create the media content buffer 350 from the encoded D-dimensional media content and transmit the encoded D-dimensional media content to a decoder 365 to decode the D-dimensional media content stored in the media content buffer 350. The decoder 365 may be configured to transfer the D-dimensional media content stored in the media content buffer 350 to the GPU memory 337 as input D-dimensional media content stored in the media content buffer 355.

The processing device 325 may be configured to implement a media content processor 345 to receive the input D-dimensional media content stored in the media content buffer 355 from the decoder 365, demultiplexer (not shown) or unwrapper (not shown). In one example, the processing device 325 may implement the media content processor 345 as a component of the GPU 340.

In one example, the media content processor 345 may be configured to apply a low-frequency-pass method to the D-dimensional media content stored in the media content buffer 155 to generate a low-frequency D-dimensional vector data set of media content (hereinafter "low frequency D-dimensional media content"). In an example, the low-frequency-pass method may comprise the media content processor 345 generating a D-dimensional Gaussian pyramid from the received D-dimensional media content stored in the media content buffer 355 and selecting a D-dimensional vector data from the lowest dimension pyramid level of the D-dimensional Gaussian pyramid to generate the low-frequency D-dimensional media content.

In one example, the media content processor 345 may be configured to obtain a structure tensor field comprising a set of D-dimensional structure tensors corresponding to each vector of the input D-dimensional media content stored in the media content buffer 355. In an example, the media content processor 345 obtaining a set of D-dimensional structure tensors may comprise the media content processor 345 computing a set of D-dimensional directional gradients for each vector of the received D-dimensional media content. In an example, the media content processor 345 obtaining a set of D-dimensional structure tensors may comprise the media content processor 345 performing a structure tensor analysis with one element of each vector of the received D-dimensional media content.

The media content processor 345 may be configured to perform an eigensystem analysis for each structure tensor in the field of structure tensors to generate a plurality of D eigenvalue fields comprising D eigenvalues for each vector of the received D-dimensional media content.

The media content processor 345 may be configured to interpolate between each vector of the received D-dimensional media content stored in the media content buffer 355 and a corresponding vector from the low-frequency D-dimensional media content in view of one or more of the D eigenvalues for each vector of the plurality of D eigenvalue fields to produce a restored-dynamic range D-dimensional vector data set of media content (hereinafter "restored-dynamic range D-dimensional media content).

In an example, interpolating may comprise the media content processor 345 linearly interpolating between each vector of the received D-dimensional media content and the corresponding vector from the low-frequency D-dimensional media content. In an example, interpolating may comprise the media content processor 345 generating a Gaussian pyramid from each of the plurality of D eigenvalue fields. The media content processor 345 may further employ one or more of the D eigenvalues to assign linear weights to each vector of the lowest resolution plurality of D eigenvalue fields. The media content processor 345 may further employ the linear weights to interpolate between each vector of the received D-dimensional media content and the corresponding vector from the low-frequency D-dimensional media content to produce the restored-dynamic range D-dimensional media content. In an example, the linear weights may be assigned in view of a region-of-support used for obtaining the structure tensor field.

In an example, the media content processor 345 employing one or more of the D eigenvalues to assign linear weights to each vector of the lowest resolution plurality of D eigenvalue fields may comprise the media content processor selecting an eigenvalue of the D eigenvalues indicative of a homogenous region of support about a vector of the received D-dimensional media content as the lower bound for assigning the linear weights. The media content processor may further select one of the remaining eigenvalues of the D eigenvalues indicative of an edge or highly textured region of support about a vector of the received D-dimensional media content as the upper bound for assigning the linear weights.

In an example, interpolating may comprise the media content processor 345 performing an interpolation jointly between all element of each vector of the received D-dimensional media content and the corresponding elements of each vector from the low-frequency D-dimensional media content.

The media content processor 345 may be configured to convey the restored-dynamic range D-dimensional media content into the media content buffer 355, suitable for display output on a display 370 or for transmission to one or more downstream devices 375.

In an example, each vector of the received D-dimensional vector data set of media content, the low-frequency D-dimensional vector data set of media content, and the restored-dynamic range D-dimensional vector data set of media content may each comprise N-dimensional scalar values where N is equal to or greater than 1. In an example, the received D-dimensional vector data set of media content, the low-frequency D-dimensional vector data set of media content, and the restored-dynamic range D-dimensional vector data of media content may each comprise D-dimensional pixel values. In an example, the pixel values may comprise color values or luminance values or both color values and luminance values.

Figure 4:
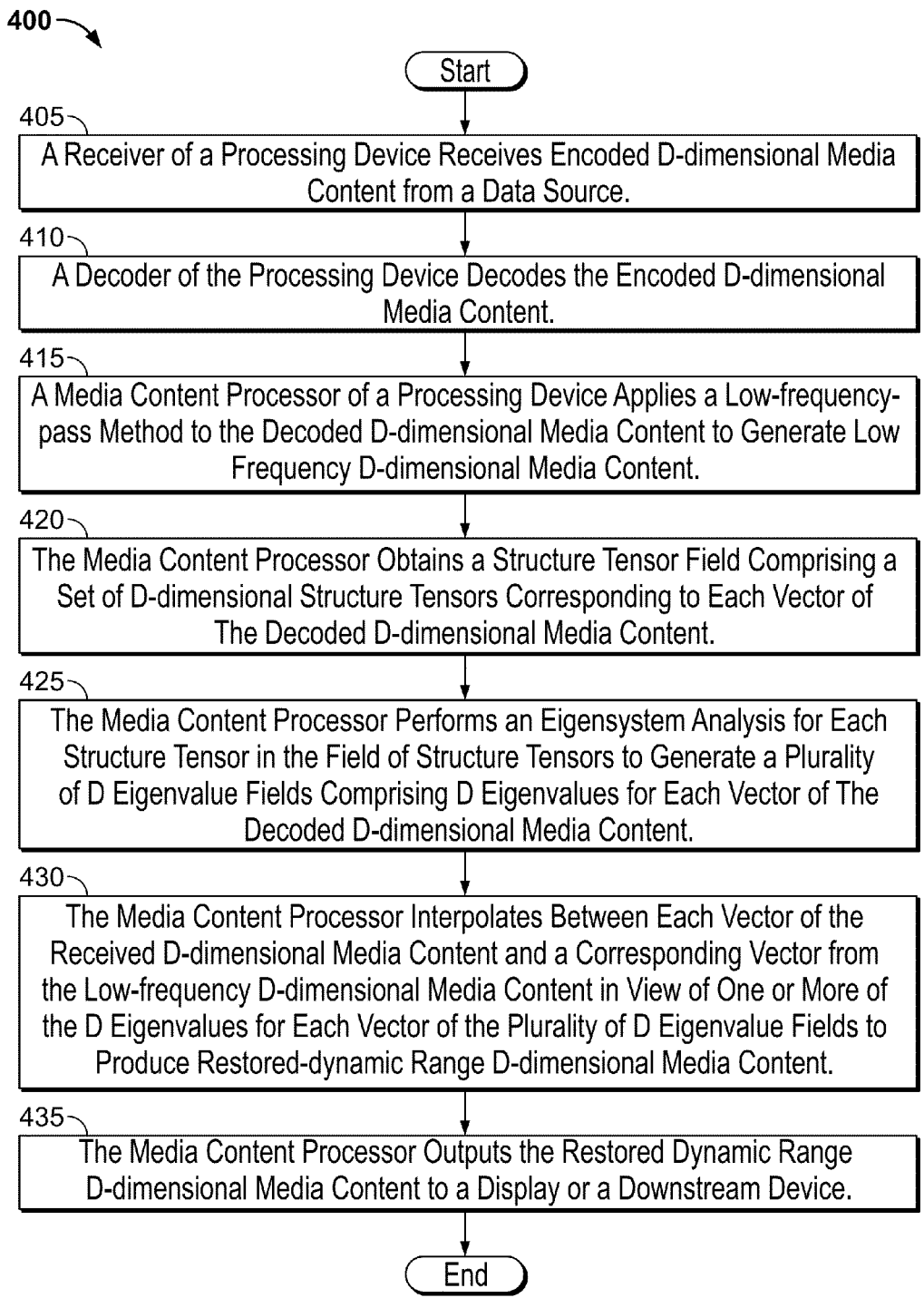
FIG. 4 is a flow diagram illustrating one example of a method for restoration of the dynamic range of D-dimensional media content without close coupling to an upstream encoding, decoding, or quantization process using the system of FIG. 3.

FIG. 4 is a flow diagram illustrating one example of a method 400 for restoration of the dynamic range of D-dimensional media content without close coupling to an upstream encoding, decoding, or quantization process. The method 400 may be performed by a computer system 300 of FIG. 3 and may comprise hardware (e.g., circuitry, dedicated logic, programmable logic, microcode, etc.), software (e.g., instructions run on a processing device), or a combination thereof. In one example, the method 400 may be performed primarily by the media content processor 345 of the computing system 300 of FIG. 3.

As shown in FIG. 4, to permit the computing system 300 to decode D-dimensional media content, at block 405, the receiver 360 may receive encoded D-dimensional media content from the data source 305. In an example, the D-dimensional media content may comprise at least one of audio, one or more two-dimensional still images, one or more three-dimensional still images, two-dimensional video, three-dimensional video, magnetic resonance imaging (MRI) data, computed tomography (CT)-scan data, geometric data, seismic data, holographic data, or meteorological data.

At block 410, the decoder 365 may decode the encoded D-dimensional media content, and may place the decoded D-dimensional media content in the media content buffer 350 of the processing device 325. The processing device 325 may transfer the decoded D-dimensional media content in the media content buffer 350 to GPU media content buffer 355 of the GPU memory 337. The media content processor 345 may receive the decoded D-dimensional media content in the media content buffer 355 from GPU memory 337.

At block 415, the media content processor 345 may apply a low-frequency-pass method to the D-dimensional media content stored in the media content buffer 355 to generate low frequency D-dimensional media content. In an example, the low-frequency-pass method may comprise the media content processor 345 generating a D-dimensional Gaussian pyramid from the received D-dimensional media content stored in the media content buffer 355 and selecting a D-dimensional vector data from the lowest dimension pyramid level of the D-dimensional Gaussian pyramid to generate the low-frequency D-dimensional media content.

At block 420, the media content processor 345 may obtain a structure tensor field comprising a set of D-dimensional structure tensors corresponding to each vector of the decoded D-dimensional media content stored in the media content buffer 355. In an example, the media content processor 345 obtaining a set of D-dimensional structure tensors may comprise the media content processor 345 computing a set of D-dimensional directional gradients for each vector of the received D-dimensional media content. In an example, the media content processor 345 obtaining a set of D-dimensional structure tensors may comprise the media content processor 345 performing a structure tensor analysis with one element of each vector of the received D-dimensional media content.

At block 425, the media content processor 345 may perform an eigensystem analysis for each structure tensor in the field of structure tensors to generate a plurality of D eigenvalue fields comprising D eigenvalues for each vector of the decoded D-dimensional media content.

At block 430, the media content processor 345 may interpolate between each vector of the received D-dimensional media content stored in the media content buffer 355 and a corresponding vector from the low-frequency D-dimensional media content in view of one or more of the D eigenvalues for each vector of the plurality of D eigenvalue fields to produce restored-dynamic range D-dimensional media content.

In an example, interpolating may comprise the media content processor 345 linearly interpolating between each vector of the received D-dimensional media content and the corresponding vector from the low-frequency D-dimensional media content. In an example, interpolating may comprise the media content processor 345 generating a Gaussian pyramid from each of the plurality of D eigenvalue fields. The media content processor 345 may further employ one or more of the D eigenvalues to assign linear weights to each vector of the lowest resolution plurality of D eigenvalue fields. The media content processor 345 may further employ the linear weights to interpolate between each vector of the received D-dimensional media content and the corresponding vector from the low-frequency D-dimensional media content to produce the restored-dynamic range D-dimensional media content. In an example, the linear weights may be assigned in view of a region-of-support used for obtaining the structure tensor field.

In an example, the media content processor 345 employing one or more of the D eigenvalues to assign linear weights to each vector of the lowest resolution plurality of D eigenvalue fields may comprise the media content processor selecting an eigenvalue of the D eigenvalues indicative of a homogenous region of support about a vector of the received D-dimensional media content as the lower bound for assigning the linear weights. The media content processor may further select one of the remaining eigenvalues of the D eigenvalues indicative of an edge or highly textured region of support about a vector of the received D-dimensional media content as the upper bound for assigning the linear weights.

In an example, interpolating may comprise the media content processor 345 performing an interpolation jointly between all element of each vector of the received D-dimensional media content and the corresponding elements of each vector from the low-frequency D-dimensional media content.

The media content processor 345 may convey the restored-dynamic range D-dimensional media content into the media content buffer 355, suitable, at block 435, for the media content processor 345 to display output on a display 370 or to transmit to one or more downstream devices 375.

In an example, the interpolating and applying a low-frequency-pass method may be performed in parallel.

In an example, each vector of the received D-dimensional vector data set of media content, the low-frequency D-dimensional vector data set of media content, and the restored-dynamic range D-dimensional vector data set of media content may each comprise N-dimensional scalar values where N is equal to or greater than 1. In an example, the received D-dimensional vector data set of media content, the low-frequency D-dimensional vector data set of media content, and the restored-dynamic range D-dimensional vector data of media content may each comprise D-dimensional pixel values. In an example, the pixel values may comprise color values or luminance values or both color values and luminance values.

Figure 5:
FIG. 5 shows an example input image.

FIG. 5 shows an example of input D-dimensional media content (e.g., an image).

Figure 6:
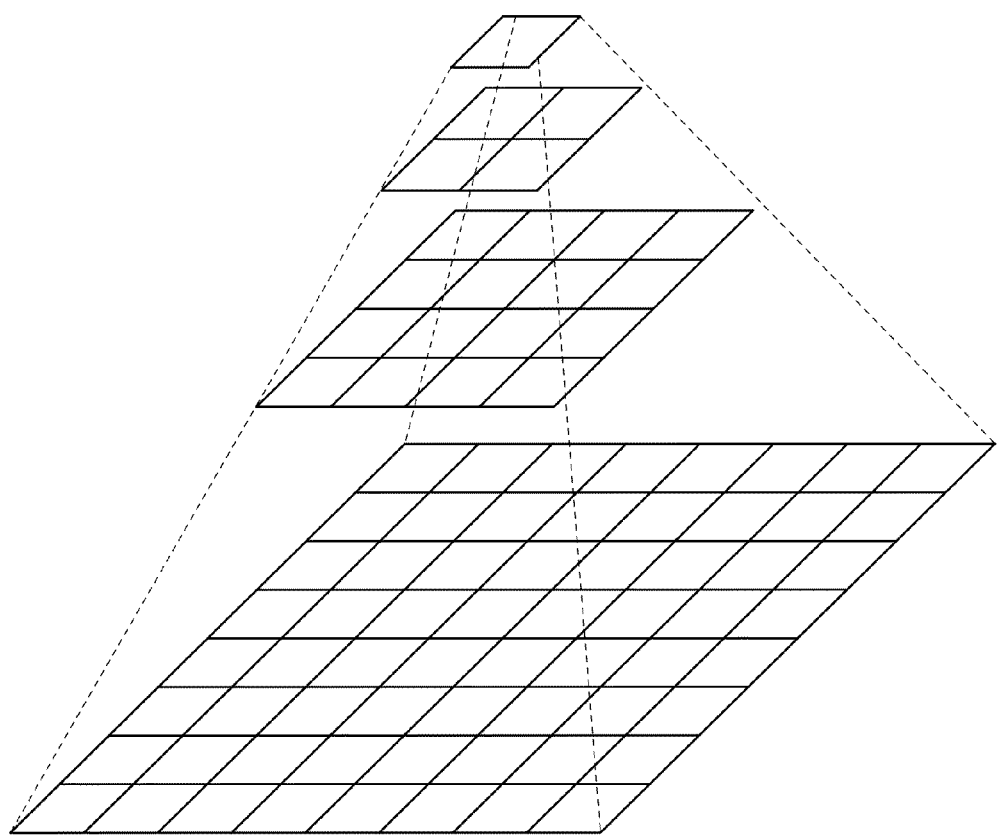
FIG. 6 shows a schematic of a constructed Gaussian Pyramid.

FIG. 6 shows a schematic of a constructed Gaussian Pyramid. As is well-known in the art, an input image may be subjected to Gaussian filtering, and subsequent octave-by-octave decimation. Each successive stage of the Gaussian pyramid is a low pass, resolution-decimated version of the original image with successively smaller image sizes. The advantage of this approach is that it generates an approximation of an expensive, low-pass filtered image without using a single pass of a Gaussian filter with an extraordinarily large region of support size. Additionally, Gaussian Pyramids operate in the pixel domain, which permits very low frequency low-pass filtration operations without resorting to convolution in the frequency domain—an expensive process.

Figure 7:
FIG. 7 shows an example Gaussian Pyramid computed from the example input image of FIG. 6.

FIG. 7 shows an example Gaussian Pyramid computed from the example input image of FIG. 5, according to examples of the present disclosure.

Figure 8:
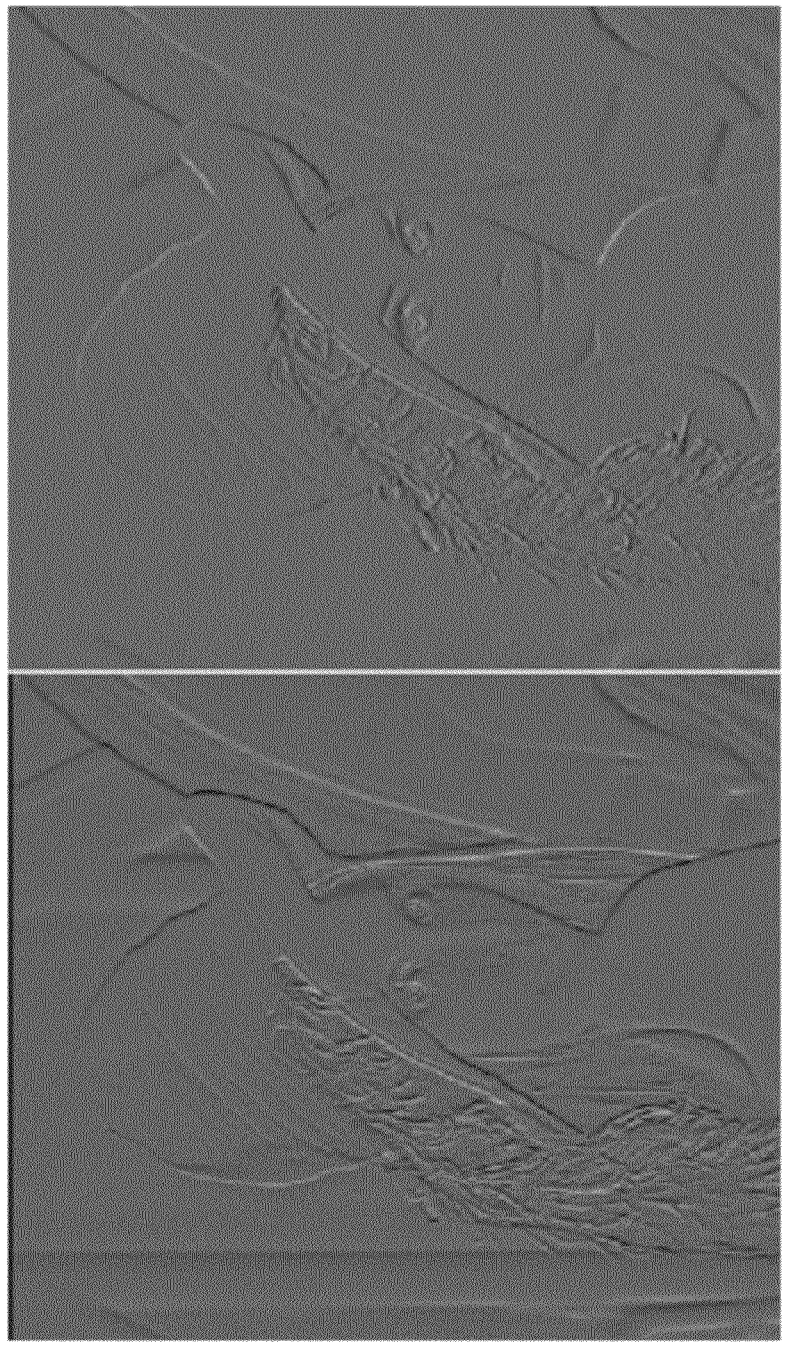
FIG. 8 shows a computed gradient field (dX, dY) from the example input image of FIG. 6.

FIG. 8 shows a computed gradient field from the example input image of FIG. 5. Examples of the present disclosure are intended to increase the dynamic range of images or data sets. A naïve way to accomplish this is by spatial interpolation, such as by blurring the images. This increases the sampling dynamic range, but at the cost of high-frequency detail such as texture and edges. In many cases, the reduced dynamic range is not visible or mathematically important around high frequencies; however, it is most noticeable in smooth gradients over large, nearly homogenous regions. Distinguishing what type of region exists within a given part of an image is a difficult problem.

Certain related art approaches may employ edge-directed smoothing—which may not be robust in regions of fine texture without strong edges. Other approaches may employ bilateral filtering or sigma filtering, which is an improvement, but suffer from needing an arbitrary threshold—setting the threshold too low results in over-smoothing in textured regions, and setting the threshold too high results in no increase of dynamic range in the areas of an image that need it. Examples of the present disclosure employ the properties of the structure tensor in order to distinguish textured, edge, detail, and homogenous regions, with the intent that only homogenous regions will be treated, while other regions are left in their original state. The first step is to compute gradients along each dimension of the data set. In the case of images, the gradients dX and dY are computed with a discrete approximation of the gradient function.

One of many possible discrete approximations of the gradient is shown in Eq. 1:

$$\frac{\partial I}{\partial x} = \frac{I(0,0,0) - I(1,0,0)}{2} + \frac{I(0,1,0) - I(1,1,0)}{2} + \frac{I(0,0,1) - I(1,0,1)}{8} + \frac{I(0,1,1) - I(1,1,1)}{8}$$

$$\frac{\partial I}{\partial y} = \frac{I(0,0,0) - I(0,1,0)}{2} + \frac{I(1,0,0) - I(1,1,0)}{2} + \frac{I(0,0,1) - I(0,1,1)}{8} + \frac{I(1,0,1) - I(1,1,1)}{8}$$

It will be appreciated by those skilled in the art that the example given in Eq. 1 is one of many appropriate discrete approximations of the gradient of each pixel. The 2-dimensional structure tensor for each pixel created using the gradients is shown in Eq. 2:

$$2D\_tensor = \begin{vmatrix} \sigma_{xx} & \sigma_{xy} \\ \sigma_{xy} & \sigma_{yy} \end{vmatrix}$$

where $\sigma_{xx}$, $\sigma_{xy}$, and $\sigma_{yy}$ for a 3×3 region-of-support are defined by Eq. 3:

$$\sigma_{xx} = \sum_{n=-1}^{n=1} \sum_{m=-1}^{m=1} \frac{\partial I(n,m)}{\partial x} \cdot \frac{\partial I(n,m)}{\partial x} \cdot \text{weight}(n,m)$$

$$\sigma_{xy} = \sum_{n=-1}^{n=1} \sum_{m=-1}^{m=1} \frac{\partial I(n,m)}{\partial x} \cdot \frac{\partial I(n,m)}{\partial y} \cdot \text{weight}(n,m)$$

$$\sigma_{yy} = \sum_{n=-1}^{n=1} \sum_{m=-1}^{m=1} \frac{\partial I(n,m)}{\partial y} \cdot \frac{\partial I(n,m)}{\partial y} \cdot \text{weight}(n,m)$$

where a possible weighting function weight (n,m) for a region-of-support of 3×3 is given by Eq. 4:

$$\text{weight}(n,m) = [0.125, 0.75, 0.125] \times [0.125, 0.75, 0.125]^T$$

It will be appreciated by those skilled in the art that other weighting functions and regions-of-support are possible.

The eigenvalue fields (two, in the case of a 2D data set such as an image) may be calculated for each tensor of each gradient of each pixel as in Eq. 5:

$$\lambda_1 = \frac{-\sigma_{xy} + \sqrt{\sigma_{xy}^2 - 4[(\sigma_{xx}\sigma_{yy}) - (\sigma_{xy}\sigma_{xy})]}}{2\sigma_{xx}}$$

$$\lambda_2 = \frac{-\sigma_{xy} + \sqrt{\sigma_{xy}^2 - 4[(\sigma_{xx}\sigma_{yy}) - (\sigma_{xy}\sigma_{xy})]}}{2\sigma_{xx}}$$

Figure 9:
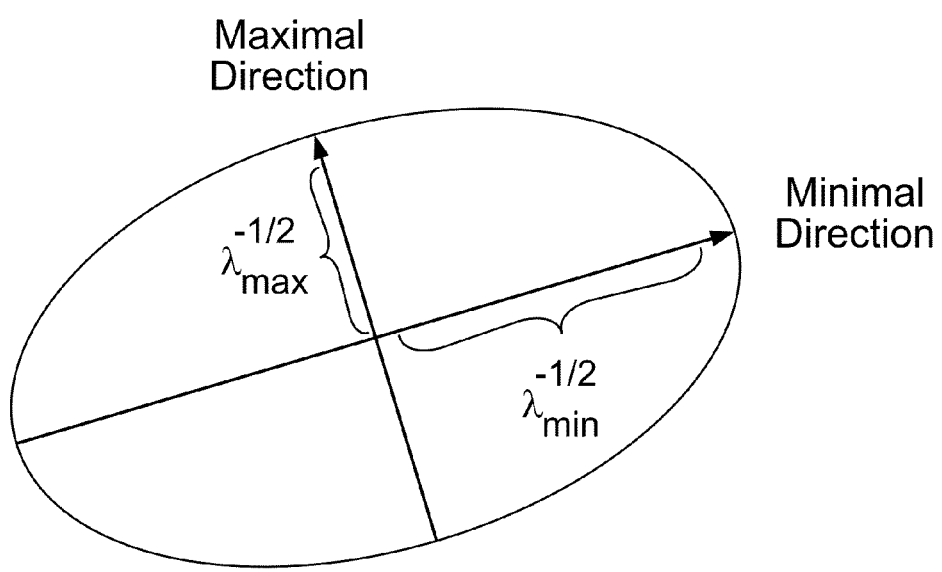
FIG. 9 shows the interpretation of the eigenvalues $lambda_1$ and $lambda_2$ for a structure tensor for a D-dimensional data set where D=2, such as an image.

FIG. 9 shows the interpretation of the eigenvalues lambda$_1$ and lambda$_2$ for a structure tensor for a D-dimensional data set where D=2, such as an image. For each tensor, and therefore, each pixel, the two eigenvalues give structural information about the region-of-support surrounding the associated pixel. In the case of D=2, as applied to image structure, two very low eigenvalues indicate very little structure, or a homogenous region. One high and one low eigenvalue indicate tendency to a strong edge. Two high or medium eigenvalues imply highly or moderately textured regions, respectively.

Figure 10:
FIG. 10 shows the two eigenvalue fields ($lambda_1$ and $lambda_2$) computed from the structure tensors of the example input image of FIG. 6, normalized for visualization in the figure.

FIG. 10 shows the two eigenvalue fields (lambda$_1$ and lambda$_2$) computed from the structure tensors of the example input image in FIG. 5, normalized for visualization in the figure. However, as sensitive as eigensystem analysis of the structure tensor is, and as superior as it may be compared to simple edge-detection and thresholding techniques, the limited region of support means that any dynamic range expansion utilizing this analysis will be limited to loss of dynamic range covering a very small area.

Figure 11:
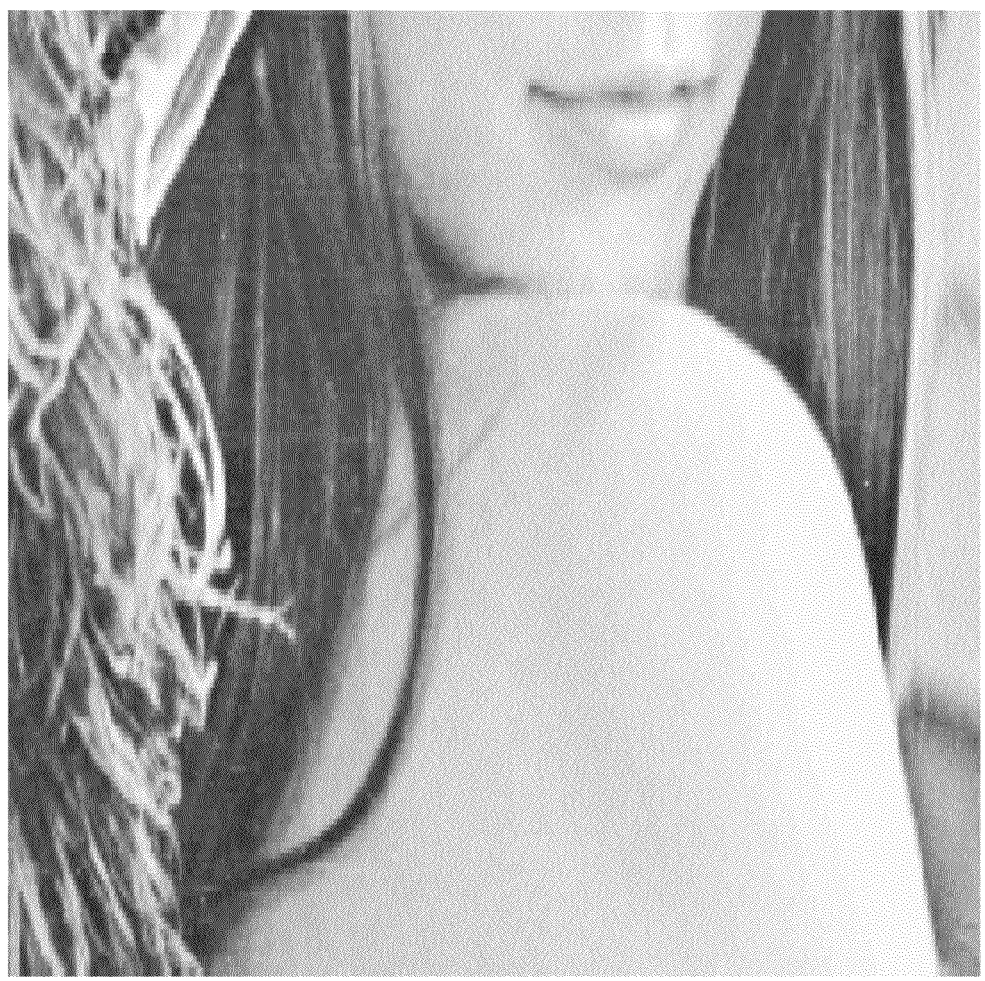
FIG. 11 shows a close up of part of the example input image of FIG. 6 with severe degradation of dynamic range, notably banding in the shoulder and arm.

FIG. 11 shows a close up of part of the original image of FIG. 5 with severe degradation of dynamic range. Note banding in the shoulder and arm. The banding in this case involves a random distribution of dots of two different quantized values. The region of transition spans much more than a 3×3 region. To permits the analysis to be sensitive to texture and edge features further away than a 3×3 region, a Gaussian pyramid of the eigenvalue fields is constructed.

Figure 12:
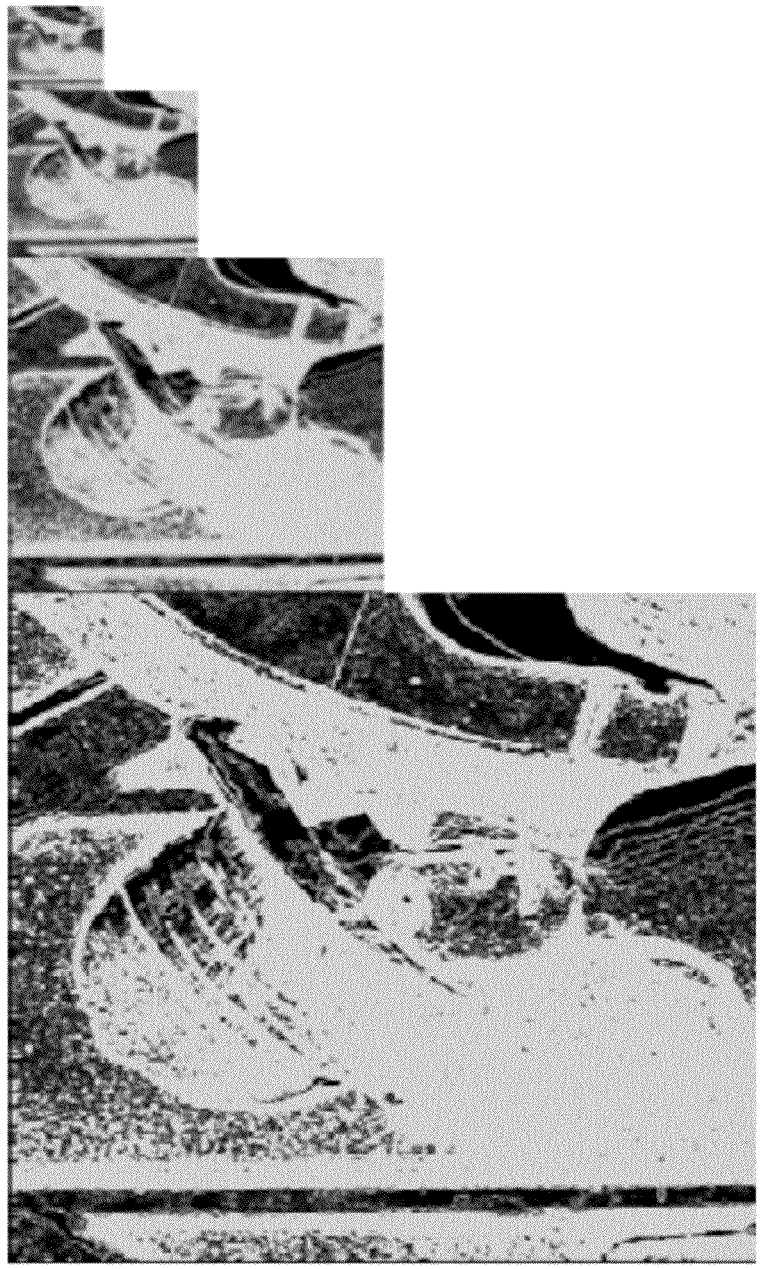
FIG. 12 shows a Gaussian pyramid constructed from the $lambda_1$ eigenvalue field of FIG. 11.

FIG. 12 shows the Gaussian pyramid constructed from the lambda$_1$ eigenvalue field of FIG. 11. With the Gaussian pyramids of all D eigenvalue fields, and given floating point precision, one has a coarse but otherwise accurate approximation of the overall structure of the region of the image or dataset surrounding a given corresponding pixel, or data element. In an example, the 4$^{th}$ pyramid level of both eigenvalue fields gives an indication of the overall structure of not just the 3×3 surrounding a given pixel of the input image, but the surrounding 16×16 region.

The overall strategy behind examples of the disclosure is to select, for each of the plurality of pixels of the input image or data set of media content, between two possible pixel or data set values. The first choice is a very accurately blurred, or multi-octave low-pass image, which effectively has increased the dynamic range of the quantized image—provided by block 215, by way of the image Gaussian pyramid. For most dynamic range reconstruction tasks for images and video, the 4$^{th}$ pyramid level suffices generated by block 215 for a sufficient approximation of a very low pass filter. While this low-pass image has increased dynamic range, it is provided at the expense of other high frequency detail such as edges and textures. The other choice is to select from the original image or dataset, which has other high frequency information, but at a lower dynamic range, including low-energy edges due to quantization.

It is desirable to select the low-pass image pixel value in regions of the image or data set where banding is evident, namely homogenous regions, when evaluated at a large scale. In areas of an image with significant structure, it is desired to select the original image pixel value from block 210. The prior eigensystem analysis from block 225 performs the structure analysis, while the subsequent Gaussian pyramid computation from block 230 ensures that the information is integrated over a large enough D-dimensional scale to prevent artifacts and over-smoothing in areas of the image with real image detail not due to quantization.

To prevent apparent and visible region boundaries in the restored dynamic range image or data set, the choice for each of the plurality of pixels between the input image from block 210 and the low-pass pyramid image from block 215 should not be a binary one. To ensure smooth transitions between these regions, a linear weighting factor is used.

The linear weighting factor is used to smoothly interpolate between the input and low-pass choices in regions of the image or data set where the structure is transitioning from homogenous to structured.

An example weighting function is given in Eq. 6:

LinearWeight($n,m$)=min($I$input($n,m$),$I$lowpass($n,m$))*
(1.0−max(min(lambda$_1$($n,m$),1.0),min(lambda$_2$($n,m$)*5.0,1.0)))

Each output pixel value has a corresponding weight that is used to linearly interpolate between the input image and the low-pass image.

Figure 13:
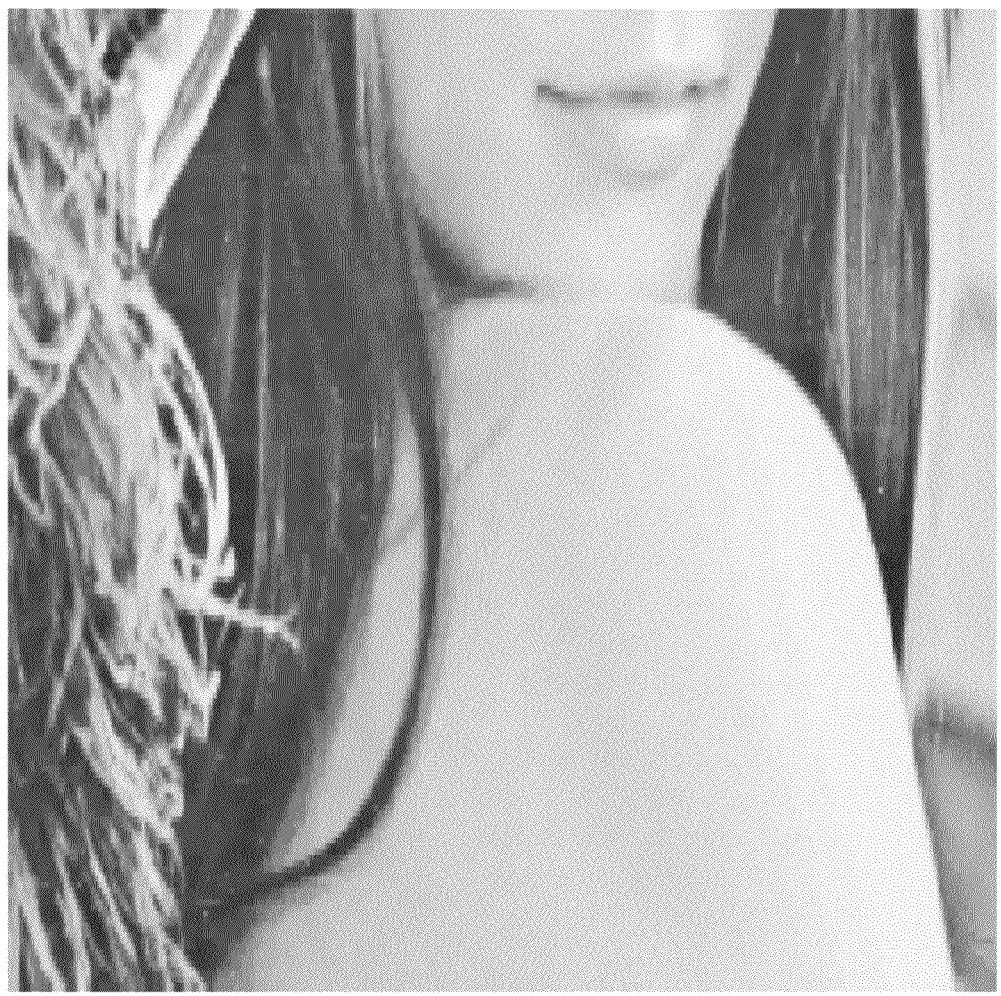
FIG. 13 shows a related art attempted reconstruction of the dynamic range of the image in FIG. 12 having loss of detail in the hair and face regions, plus severe contouring is not eliminated.

FIG. 13 shows an attempted reconstruction in the related art of the dynamic range of the image in FIG. 12—note the loss of detail in the hair and face regions, plus the severe contouring is not eliminated. Edge-directed, bilateral, and frequency-domain dynamic range reconstruction techniques are prone to false positives such as smoothing areas that should not be smoothed, and false negatives such as missing banding and dynamic range quantization artifacts altogether.

Figure 14:
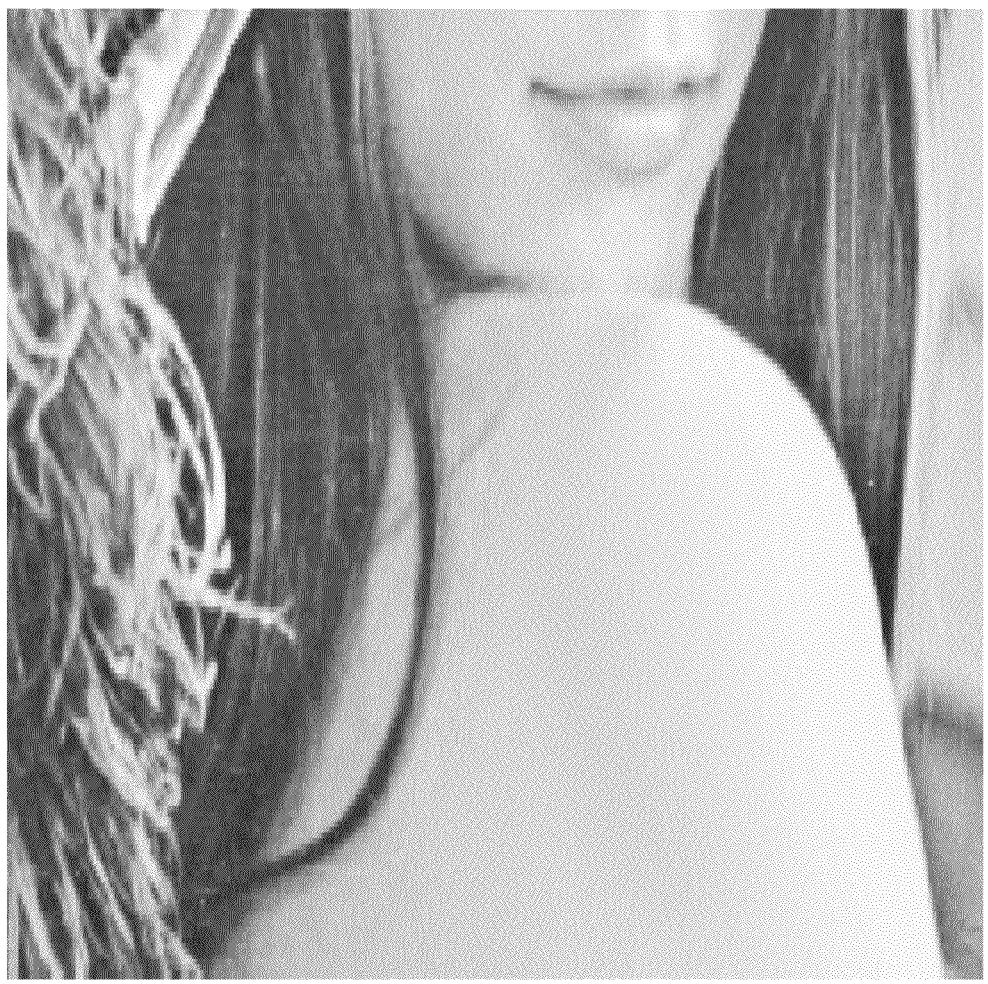
FIG. 14 shows reconstruction of the dynamic range of the image of FIG. 12 using examples of the present disclosure.

FIG. 14 shows reconstruction of the dynamic range of the image of FIG. 12 using the examples of the present disclosure.

The dynamic range restoration process of examples of the present disclosure is efficient enough to perform in greater-than-real-time for 4K video resolution video at 30 fps on contemporaneous, commercial, mass-marketed computer hardware, and multiple images and video at a variety of resolutions in real-time and near-real-time. Additionally, the dynamic range restoration process of embodiments of the present disclosure is efficient enough to perform on any end-user device with a GPU, CPU, or APU at full HD resolutions for single instances of video and images, such as feature phones, smart phones, tablets, laptops, PCs, set-top boxes, and televisions.

This combination of efficiencies at the decoder proximity employing examples of the present disclosure opens up new applications. These applications include, but are not limited to, real-time improved video coder efficiency for over-the-top video delivery, cost-effective real-time reduction of public radio-access-network congestion when both uploading and downloading video and image data from mobile devices, increased real-time pass-band television delivery capacity, increase of satellite transponder capacity, reduction of storage costs for content management systems and network DVR architectures, and high-throughput treatment of images and video at the distribution network core, all by means of permitting existing encoding processes to transmit and store images, video, and other datasets with less dynamic range than has been previously possible.

Figure 15:
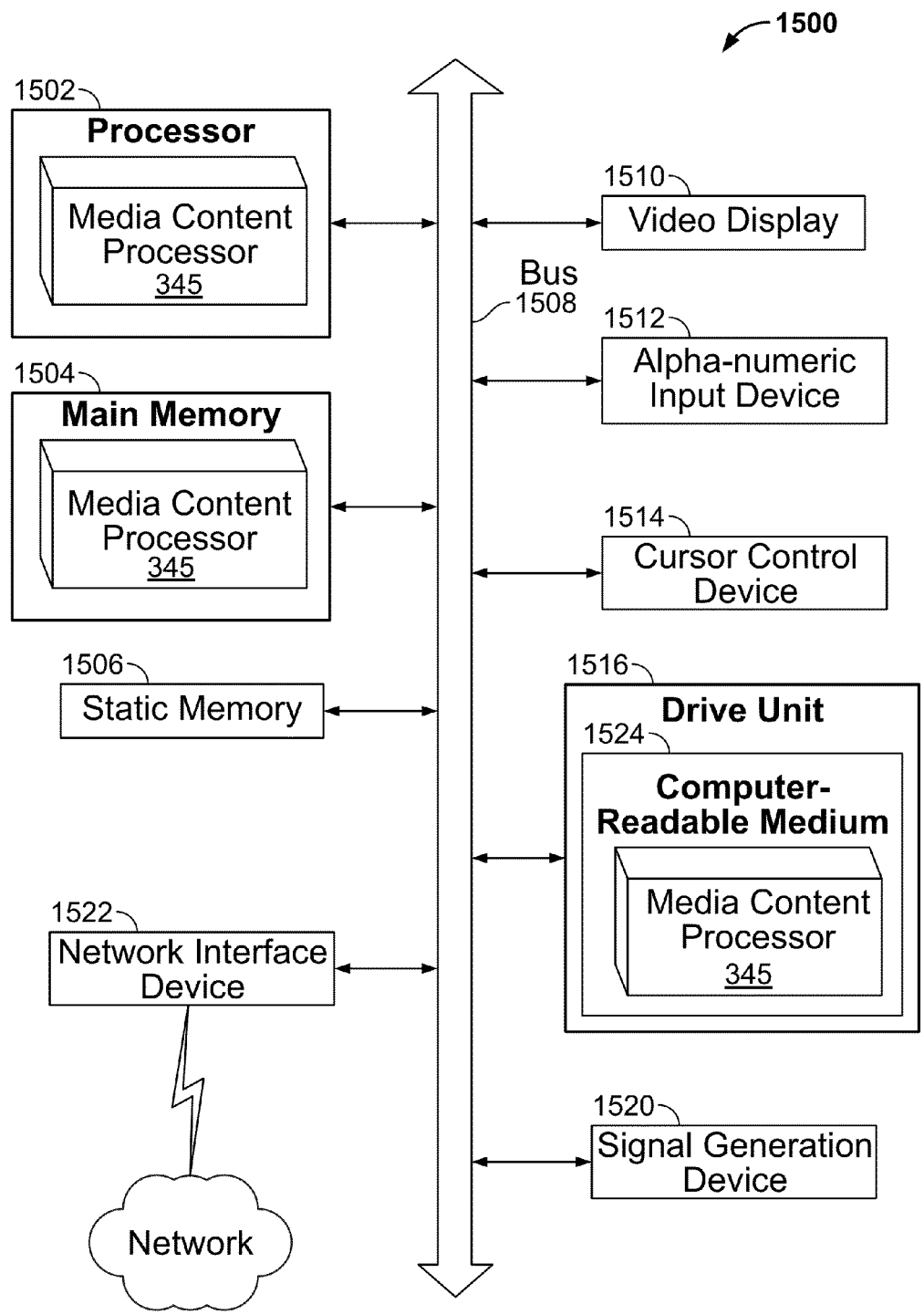
FIG. 15 illustrates a diagrammatic representation of a machine in the example form of a computer system within which a set of instructions, for causing the machine to perform any one or more of the methodologies discussed herein, may be executed.

FIG. 15 illustrates a diagrammatic representation of a machine in the example form of a computer system 1500 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processing device (processor) 1502, a main memory 1504 (e.g., read-only memory (ROM), flash memory, dynamic random access memory (DRAM) such as synchronous DRAM (SDRAM)), a static memory 1506 (e.g., flash memory, static random access memory (SRAM)), and a data storage device 1516, which communicate with each other via a bus 1508.

Processor 1502 represents one or more general-purpose processing devices such as a microprocessor, central processing unit, or the like. More particularly, the processor 1502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1502 may also be one or more special-purpose processing devices such as an application specific integrated circuit (ASIC), a field programmable gate array (FPGA), a digital signal processor (DSP), network processor, or the like. The color channel processor 145 and the media content processor 345, shown in FIGS. 1 and 3, respectively, may be executed by processor 1502 configured to perform the operations and steps discussed herein.

The computer system 1500 may further include a network interface device 1522. The computer system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), and a signal generation device 1520 (e.g., a speaker).

A drive unit 1516 may include a computer-readable medium 1524 on which is stored one or more sets of instructions (e.g., instructions of the color channel processor 145 and the media content processor 345) embodying any one or more of the methodologies or functions described herein. The instructions of the media content processor 145 may also reside, completely or at least partially, within the main memory 1504 and/or within the processor 1502 during execution thereof by the computer system 1500, the main memory 1504 and the processor 1502 also constituting computer-readable media. The instructions of the color channel processor 145 and the media content processor 345 may further be transmitted or received over a network via the network interface device 1522.

While the computer-readable storage medium 1524 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and translates to a new coordinate system the data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. The system and method as disclosed herein restoration of the dynamic range of images, video and other D-dimensional data sets without close coupling to an upstream encoding, decoding, or other quantization process, improves the perceptual quality and/or the transmission or storage efficiency of existing image and video compression or transmission systems and methods solves problems in many fields, such as real-time efficiency for over-the-top video delivery, cost-effective real-time reduction of public radio-access-network congestion when both uploading and downloading video and image data from mobile devices, increased real-time passband television delivery capacity, increase of satellite transponder capacity, reduction of storage costs for content management systems and network DVR architectures, and high-throughput treatment of images and video at the distribution network core as but a few examples.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
    receiving, by a processor from an upstream device, a D-dimensional vector data set of media content, wherein D is greater than or equal to one;
    applying, by a processor, a low-frequency-pass method to the received D-dimensional vector data set of media content to generate a low-frequency D-dimensional vector data set of media content;
    obtaining, by the processor, a structure tensor field comprising a set of D-dimensional structure tensors corresponding to each vector of the received D-dimensional vector data set of media content;
    performing, by the processor, an eigensystem analysis for each structure tensor in the field of structure tensors to generate a plurality of D eigenvalue fields comprising D eigenvalues for each vector of the received D-dimensional vector data set of media content;
    interpolating, by the processor, between each vector of the received D-dimensional vector data set of media content and a corresponding vector from the low-frequency D-dimensional vector data set of media content in view of one or more of the D eigenvalues for each vector of the plurality of D eigenvalue fields to produce a restored-dynamic range D-dimensional vector data set of media content; and
    outputting, by the processor, the restored-dynamic range D-dimensional vector data set of media content to a display or downstream device.

2. The method of claim 1, wherein applying a low-frequency-pass method to the received D-dimensional vector data set of media content comprises:
    generating a D-dimensional Gaussian pyramid from the received D-dimensional vector data set of media content; and
    selecting D-dimensional vector data from the lowest dimension pyramid level of the D-dimensional Gaussian pyramid to generate the low-frequency D-dimensional vector data set of media content.

3. The method of claim 1, wherein obtaining a set of D-dimensional structure tensors comprises computing a set of D-dimensional directional gradients for each vector of the received D-dimensional vector data set of media content.

4. The method of claim 1, wherein obtaining a set of D-dimensional structure tensors comprises performing a structure tensor analysis with one element of each vector of the received D-dimensional vector data set of media content.

5. The method of claim 1, wherein interpolating comprises linearly interpolating between each vector of the received D-dimensional vector data set of media content and the corresponding vector from the low-frequency D-dimensional vector data set of media content.

6. The method of claim 1, wherein interpolating comprises:
    generating a Gaussian pyramid from each of the plurality of D eigenvalue fields;
    employing one or more of the D eigenvalues to assign linear weights to each vector of the lowest resolution plurality of D eigenvalue fields; and
    employing the linear weights to interpolate between each vector of the received D-dimensional vector data set of media content and the corresponding vector from the low-frequency D-dimensional vector data set of media to produce the restored-dynamic range D-dimensional vector data set of media content.

7. The method of claim 6, wherein the linear weights are assigned in view of a region-of-support used for obtaining the structure tensor field.

8. The method of claim 6, wherein employing one or more of the D eigenvalues to assign linear weights to each vector of the lowest resolution plurality of D eigenvalue fields comprises:
    selecting an eigenvalue of the D eigenvalues indicative of a homogenous region of support about a vector of the received D-dimensional vector data as the lower bound for assigning the linear weights; and
    selecting one of the remaining eigenvalues of the D eigenvalues indicative of an edge or highly textured region of support about a vector of the received D-dimensional vector data as the upper bound for assigning the linear weights.

9. The method of claim 1, wherein interpolating comprises performing an interpolation jointly between all element of each vector of the received D-dimensional vector data set and the corresponding elements of each vector from the low-frequency D-dimensional vector data set.

10. The method of claim 1, wherein said applying a low-frequency-pass method and said interpolating are performed in parallel.

11. The method of claim 1, wherein the media content comprises at least one of audio, one or more two-dimensional still images, one or more three-dimensional still images, two-dimensional video, three-dimensional video, magnetic resonance imaging (MRI) data, computed tomography (CT)-scan data, geometric data, seismic data, holographic data, or meteorological data.

12. The method of claim 1, wherein each vector of the received D-dimensional vector data set of media content, the low-frequency D-dimensional vector data set of media content, and the restored-dynamic range D-dimensional vector data set of media content comprises N-dimensional scalar values where N is equal to or greater than 1.

13. The method of claim 1, wherein the received D-dimensional vector data set of media content, the low-frequency D-dimensional vector data set of media content, and the restored-dynamic range D-dimensional vector data set of media content each comprise D-dimensional pixel values.

14. The method of claim 13, wherein the pixel values comprise color values or luminance values or both color values and luminance values.

15. A system, comprising:
a memory;
a processing device coupled to and having use of the memory, the processing device to:
receive, from an upstream device, a D-dimensional vector data set of media content, wherein D is greater than or equal to one;
apply a low-frequency-pass method to the received D-dimensional vector data set of media content to generate a low-frequency D-dimensional vector data set of media content;
obtain a structure tensor field comprising a set of D-dimensional structure tensors corresponding to each vector of the received D-dimensional vector data set of media content;
perform an eigensystem analysis for each structure tensor in the field of structure tensors to generate a plurality of D eigenvalue fields comprising D eigenvalues for each vector of the received D-dimensional vector data set of media content;
interpolate between each vector of the received D-dimensional vector data set of media content and a corresponding vector from the low-frequency D-dimensional vector data set of media content in view of one or more of the D eigenvalues for each vector of the plurality of D eigenvalue fields to produce a restored-dynamic range D-dimensional vector data set of media content; and
output the restored-dynamic range D-dimensional vector data set of media content to a display or downstream device.

16. The system of claim 15, wherein applying a low-frequency-pass method to the received D-dimensional vector data set of media content comprises:
generating a D-dimensional Gaussian pyramid from the received D-dimensional vector data set of media content; and
selecting D-dimensional vector data from the lowest dimension pyramid level of the D-dimensional Gaussian pyramid to generate the low-frequency D-dimensional vector data set of media content.

17. The system of claim 15, wherein obtaining a set of D-dimensional structure tensors comprises computing a set of D-dimensional directional gradients for each vector of the received D-dimensional vector data set of media content.

18. The system of claim 15, wherein obtaining a set of D-dimensional structure tensors comprises performing a structure tensor analysis with one element of each vector of the received D-dimensional vector data set of media content.

19. The system of claim 15, wherein interpolating comprises:
generating a Gaussian pyramid from each of the plurality of D eigenvalue fields;
employing one or more of the D eigenvalues to assign linear weights to each vector of the lowest resolution plurality of D eigenvalue fields; and
employing the linear weights to interpolate between each vector of the received D-dimensional vector data set of media content and the corresponding vector from the low-frequency D-dimensional vector data set of media to produce the restored-dynamic range D-dimensional vector data set of media content.

20. A non-transitory computer-readable storage medium including instructions that, when accessed by a processing device, cause the processing device to perform operations comprising:

receiving, by the processing device from an upstream device, a D-dimensional vector data set of media content, wherein D is greater than or equal to one;
applying, by the processing device, a low-frequency-pass method to the received D-dimensional vector data set of media content to generate a low-frequency D-dimensional vector data set of media content;
obtaining, by the processing device, a structure tensor field comprising a set of D-dimensional structure tensors corresponding to each vector of the received D-dimensional vector data set of media content;
performing, by the processing device, an eigensystem analysis for each structure tensor in the field of structure tensors to generate a plurality of D eigenvalue fields comprising D eigenvalues for each vector of the received D-dimensional vector data set of media content;
interpolating, by the processing device, between each vector of the received D-dimensional vector data set of media content and a corresponding vector from the low-frequency D-dimensional vector data set of media content in view of one or more of the D eigenvalues for each vector of the plurality of D eigenvalue fields to produce a restored-dynamic range D-dimensional vector data set of media content; and
outputting, by the processing device, the restored-dynamic range D-dimensional vector data set of media content to a display or downstream device.

21. The non-transitory computer-readable storage medium of claim 20, wherein applying a low-frequency-pass method to the received D-dimensional vector data set of media content comprises:
generating a D-dimensional Gaussian pyramid from the received D-dimensional vector data set of media content; and
selecting D-dimensional vector data from the lowest dimension pyramid level of the D-dimensional Gaussian pyramid to generate the low-frequency D-dimensional vector data set of media content.

22. The non-transitory computer-readable storage medium of claim 20, wherein obtaining a set of D-dimensional structure tensors comprises computing a set of D-dimensional directional gradients for each vector of the received D-dimensional vector data set of media content.

23. The non-transitory computer-readable storage medium of claim 20, wherein obtaining a set of D-dimensional structure tensors comprises performing a structure tensor analysis with one element of each vector of the received D-dimensional vector data set of media content.

24. The non-transitory computer-readable storage medium of claim 20, wherein interpolating comprises:
generating a Gaussian pyramid from each of the plurality of D eigenvalue fields;
employing one or more of the D eigenvalues to assign linear weights to each vector of the lowest resolution plurality of D eigenvalue fields; and
employing the linear weights to interpolate between each vector of the received D-dimensional vector data set of media content and the corresponding vector from the low-frequency D-dimensional vector data set of media to produce the restored-dynamic range D-dimensional vector data set of media content.

* * * * *